(12) United States Patent
Ickin et al.

(10) Patent No.: US 12,556,034 B2
(45) Date of Patent: Feb. 17, 2026

(54) METHOD FOR ENERGY HARVESTING AND WIRELESS CHARGING

(71) Applicant: Telefonaktiebolaget LM Ericsson (publ), Stockholm (SE)

(72) Inventors: Selim Ickin, Stocksund (SE); Lackis Eleftheriadis, Valbo (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 74 days.

(21) Appl. No.: 18/036,953

(22) PCT Filed: Nov. 18, 2020

(86) PCT No.: PCT/SE2020/051102
§ 371 (c)(1),
(2) Date: May 15, 2023

(87) PCT Pub. No.: WO2022/108495
PCT Pub. Date: May 27, 2022

(65) Prior Publication Data
US 2024/0006914 A1    Jan. 4, 2024

(51) Int. Cl.
*H02J 50/00* (2016.01)
*H02J 50/20* (2016.01)
(Continued)

(52) U.S. Cl.
CPC ............ *H02J 50/001* (2020.01); *H02J 50/20* (2016.02); *H02J 50/80* (2016.02); *H02J 50/90* (2016.02)

(58) Field of Classification Search
None
See application file for complete search history.

(56) References Cited

U.S. PATENT DOCUMENTS

| 10,493,856 B2 | 12/2019 | Caldwell et al. |
| 2014/0004912 A1 | 1/2014 | Rajakarunanayake |

(Continued)

FOREIGN PATENT DOCUMENTS

WO    2021086241 A1    5/2021

OTHER PUBLICATIONS

Ritter, Andreas, "Power Consumption Measurements for IoT Applications", Application Note, 1TD07_2e, Rohde & Schwarz, Aug. 2019, 1-16.

(Continued)

*Primary Examiner* — Daniel Kessie
(74) *Attorney, Agent, or Firm* — Murphy, Bilak & Homiller, PLLC (57) ABSTRACT

Embodiment herein disclose a method performed a network node for energy harvesting. The transmitter, the receiver unit operate in the network node. The receiver unit is positioned at a distance 'd' from the transmitter to produce a first amount of electrical energy. Further, the performance parameters are collected by a control unit from at least one wireless device to determine a preferred distance required between the receiver unit and the transmitter. Thereafter, the position of the receiver unit is adjusted by the control unit, at the preferred distance to the transmitter to harvest a second amount of electrical energy, where second amount is greater than the first amount. Further, at least one of the first amount or second amount of electrical energy harvested by the receiver unit is stored in a power distribution unit.

20 Claims, 7 Drawing Sheets

(51) Int. Cl.
  *H02J 50/80* (2016.01)
  *H02J 50/90* (2016.01)

(56) References Cited

U.S. PATENT DOCUMENTS

| | | |
|---|---|---|
| 2015/0380973 A1 | 12/2015 | Scheb |
| 2021/0135509 A1 | 5/2021 | Pan et al. |
| 2022/0045554 A1* | 2/2022 | Leabman ................. H02J 50/80 |
| 2023/0150383 A1* | 5/2023 | Liu ......................... B60L 53/36 |
| | | 320/108 |

OTHER PUBLICATIONS

Zhang, Hao, et al., "Uneven-to-Even Power Distribution for Maintaining High Efficiency of Dual Linearly-Polarized Rectenna", IEEE Microwave and Wireless Components Letters, DOI: 10.1109/LMWC.2018.2877179, Research Gate, Nov. 2018, 1-4.

* cited by examiner

METHOD FOR ENERGY HARVESTING AND WIRELESS CHARGING

TECHNICAL FIELD

The present disclosure relates to a field of wireless charging, and more specifically to a network node, and methods performed thereby, for providing the charging of a wireless device.

BACKGROUND

Wireless devices are enabled to communicate wirelessly in a cellular communications network or wireless communication network, sometimes also referred to as a cellular radio system, cellular system, or cellular network. Examples of wireless devices include User Equipment's (UEs), stations (STAs), mobile terminals, wireless terminals, IoT sensors, and/or Mobile Stations (MS). The communication may be between a wireless device and a regular telephone, and/or between a wireless device and a server via a Radio Access Network (RAN), and possibly one or more core networks, comprised within the wireless communications network. Currently, users rely on seamless and uninterrupted communication between the wireless devices for their daily activities. Thus, it is essential to have solutions that assist in effective functioning of the wireless devices.

The wireless communications network covers a geographical area which may be divided into cell areas, each cell area being served by a network node, such as radio network node or Base Station (BS), which sometimes may be referred to as e.g., Transmission Point (TP), Radio Base Station (RBS), gNB, evolved Node B ("eNB"), "eNodeB", "NodeB", "B node", or BTS (Base Transceiver Station), depending on the technology and terminology used. The wireless communications network may also be a non-cellular system, comprising network nodes which may serve receiving nodes, such as wireless devices, with serving beams. In 3rd Generation Partnership Project (3GPP) Long Term Evolution (LTE), base stations, which may be referred to as eNodeBs or even eNBs, may be directly connected to one or more core networks. The expression Downlink (DL) may be used for the transmission path from the base station to the wireless device. The expression Uplink (UL) may be used for the transmission path in the opposite direction i.e., from the wireless device to the base station.

NR

5G NR (New Radio) is a new radio access technology (RAT) developed by 3GPP for the 5G (fifth generation) mobile network, which is an example of communication network that can be used for energy harvesting. In the current concept, gNB denotes an NR BS, where one NR BS may correspond to one or more transmission and/or reception points.

One of the main goals of NR is to provide more capacity for operators to serve ever increasing traffic demands and variety of applications. Thus, typically, NR operates on high frequencies, such as frequencies over 6 GHz, until 60 or even 100 GHz.

As wireless communications networks grow, it becomes pertinent to monitor the base station and ensure uninterrupted functioning of the base station. A plurality of wireless sensors may be deployed for monitoring the base station. Further, Unmanned Aerial Vehicles (UAVs) are used for surveying and perform on-site repair on the base station. However, continuous performance of the wireless sensors and UAVs requires wireless charging. Some of the existing base stations are configured to provide wireless charging to such devices. Further, the existing base stations have high energy requirements with various nodes (within the base station) being required to operate continually. Such increasing energy requirements at base stations need to be met by an improved energy harvesting means that can maximise the energy harvested. Thus, there exists a need for improvements in the network node (or base station) for smart energy management along with wireless charging.

A challenge therefore exists to satisfy the requirements of battery charging for wireless devices with maximised energy harvesting, where the energy harvested may be stored for future use by the base station.

SUMMARY

It is an object of embodiments herein to improve charging of a wireless device in a wireless communications network. More particularly, it is an object of embodiments herein to improve the amount of energy harvested in a wireless communications network. Furthermore, it is desired to maximise the energy harvested without comprising the performance parameters (QoE and QoS) of the user equipment.

According to a first aspect of embodiments herein, the object is achieved by a method performed by a network node. A transmitter, a control unit and a receiver unit forms part of the network node utilities and harvesting energy as one entity. The method comprises utilising the transmitter (for example, a radio antenna) to transmit electromagnetic waves in a first direction. The method further comprises positioning the receiver unit at a distance 'd' from the transmitter. The method comprises producing a first amount electrical energy in the receiver unit in response to the electromagnetic waves. Further, the method comprises collecting performance parameters from at least one wireless device 130 during the production of the first amount of electrical energy. The method comprises determining by the control unit a preferred distance required between the receiver unit and the transmitter, responsive to the collected performance parameters, wherein the preferred distance is a distance at which a higher amount of electrical energy may be produced. The method comprises adjusting by the control unit the position of the receiver unit at the preferred distance from the transmitter to harvest a second amount of electrical energy, where the second amount is greater than the first amount. Finally, the method comprises storing at least one of the first amount or second amount of electrical energy harvested by the receiver unit in a power distribution unit.

According to a second aspect of embodiments herein, the object is achieved by a method performed by a network node. A control unit (for example, base band) may be present in the network node. The control unit determines at least one of desired angle of tilt of the transmitter by using a machine learning process with performance parameters received from at least one of the wireless device 130's as an input. The control unit further transmits commands including at least one of the preferred distance and desired angle of tilt to the receiver unit and the transmitter respectively.

According to a third aspect of embodiments herein, the object is achieved by the network node present in a wireless communications network. The network node comprises a transmitter, a control unit and a receiver unit forms part of the network node. The network node is configured to position the receiver unit at a distance 'd' from the transmitter to produce a first amount of electrical energy. Further, network node collects the performance parameters from at least one wireless device 130 to determine a preferred distance required between the receiver unit and the transmitter. Thereafter, the network node adjusts the position of the receiver unit at the preferred distance to the transmitter to harvest a second amount of electrical energy, where second amount of electrical energy is greater than the first amount. Further, the network node stores at least one of the first amount or second amount of electrical energy harvested by the receiver unit in a power distribution unit.

At least one of the aspects of the present invention provides a network node that can comparatively increase the energy harvested by the transmitter without affecting the performance parameters of the wireless devices in an area serviced by the network node. Another advantage of the present invention is that the network node may provide electrical energy to wireless devices or store the electrical energy within the network node for later usage. Yet another advantage of the present invention is that the network node provides a receiver unit for energy harvesting with a control functionality, so that the distance of the receiver unit may be increased or decreased with the proviso of interference.

BRIEF DESCRIPTION OF THE DRAWINGS

Examples of embodiments herein are described in more detail with reference to the accompanying drawings, in which.

DETAILED DESCRIPTION

Certain aspects of the present disclosure and their embodiments may provide solutions to the challenges discussed in the background section. There are, proposed herein, various embodiments which address one or more of the issues disclosed herein.

Embodiments herein may be understood to be related to providing a mechanism to allow a wireless device to harvest energy in a network node and further provide wireless charging to devices in a coverage area (of the network node) and also feed harvested energy to a base station. In existing methods, it is possible to charge devices wirelessly with techniques known as Wireless Power Transfer (WPT). Further, it is also possible to provide wireless charging of wireless devices such as UAV, user equipment's and IoT devices using a network node. The network node may be part of a communication network.

The embodiments described herein present a system and a method for providing directional wireless charging with improved energy harvesting capabilities. More particularly, embodiments herein also relate to a method using a network node for controlling the energy harvesting without affecting performance parameters of the wireless devices in a coverage area.

Some of the embodiments will now be described more fully hereinafter with reference to the accompanying drawings, in which examples are shown. The disclosed subject matter should not be construed as limited to only the embodiments set forth herein; rather, these embodiments are provided by way of example to convey the scope of the subject matter to those skilled in the art. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Note that although terminology from LTE/5G has been used in this disclosure to exemplify the embodiments herein, this should not be seen as limiting the scope of the embodiments herein to only the aforementioned system. Other wireless systems with similar features, may also benefit from exploiting the ideas covered within this disclosure.

Figure 1:
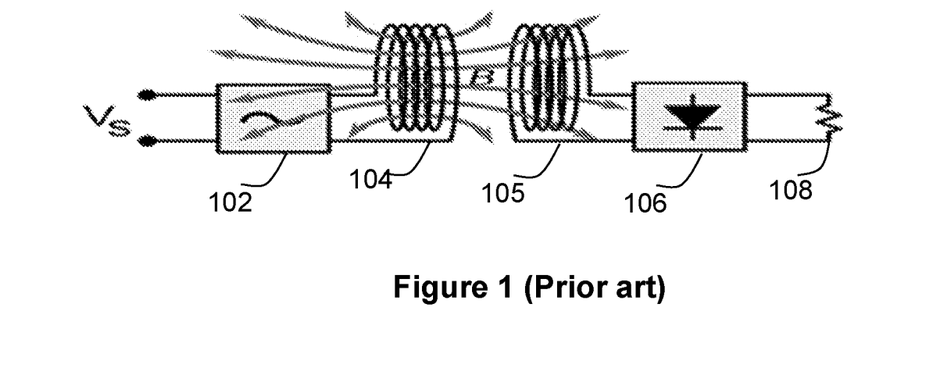
FIG. 1 is a schematic diagram illustrating an example of a wireless charging arrangement, according to existing methods.

FIG. 1 depicts an exemplary arrangement for wireless charging in accordance with the prior art. The arrangement comprises a power source Vs, an oscillator 102, a primary induction coil 104, a second induction coil 105, a rectifier 106 and a load or battery 108. Energy is transferred from source Vs to load 108 through inductive coupling. An alternating current is run through the induction coil 104 in the charging station, which is further transferred to the secondary induction coil 105 present in the receiving station. The secondary induction coil 105 generates alternating current which is converted to direct current with a rectifier 106 and used to charge a battery 108 or provide operating power.

Figure 2:
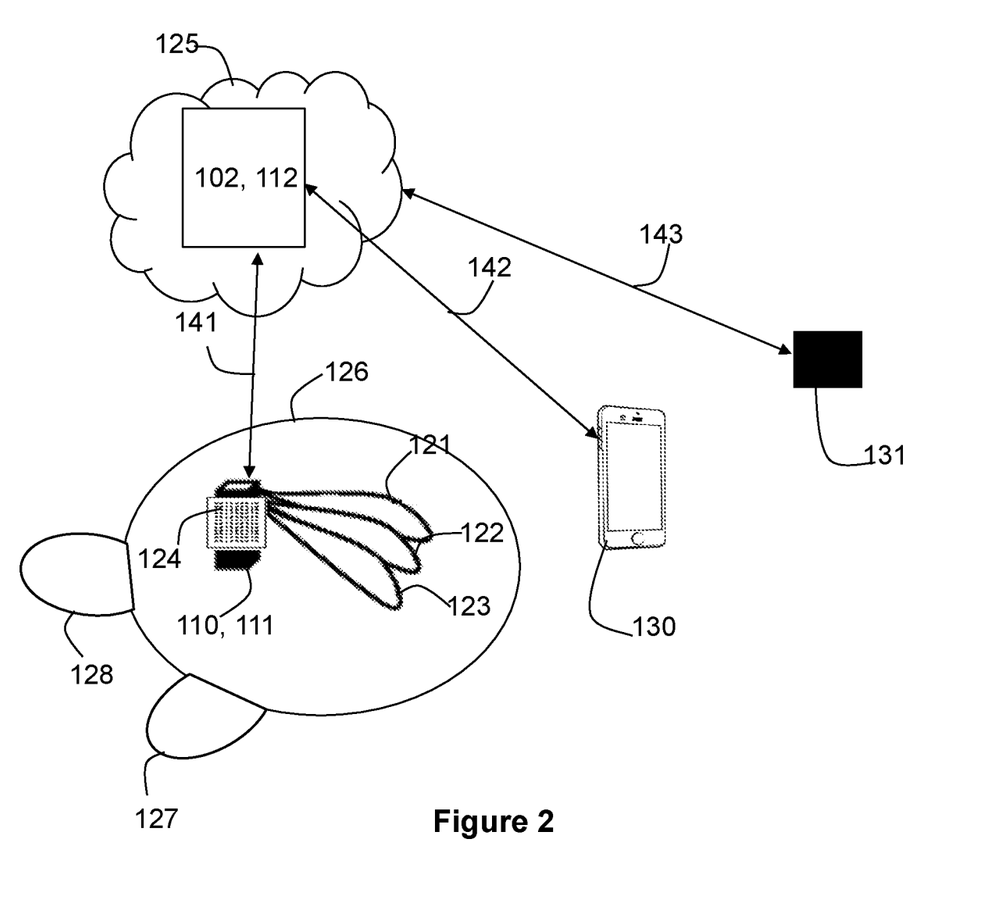
FIG. 2 is a schematic diagram illustrating a wireless communications network, according to embodiments herein.

FIG. 2 depicts a non-limiting example of a wireless communications network 100, sometimes also referred to as a wireless communications system, cellular radio system, or cellular network, in which embodiments herein may be implemented. The wireless communications network 100 may be a 5G system, 5G network, NR-U or Next Gen System or network, LAA, or MulteFire. The wireless communications network 100 may alternatively be a younger system than a 5G system. The wireless communications network 100 may support other technologies such as, for example, Long-Term Evolution (LTE), LTE-Advanced/LTE-Advanced Pro, e.g. LTE Frequency Division Duplex (FDD), LTE Time Division Duplex (TDD), LTE Half-Duplex Frequency Division Duplex (HD-FDD), LTE operating in an unlicensed band, Narrow Band Internet of Things (NB-IoT), Wideband Code Division Multiple Access (WCDMA), Universal Terrestrial Radio Access (UTRA) TDD, Global System for Mobile communications (GSM) network, GSM/Enhanced Data Rate for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, Wireless Local Area Network/s (WLAN) or WiFi network/s, Worldwide Interoperability for Microwave Access (WiMax), IEEE 802.15.4-based low-power short-range networks such as IPv6 over Low-Power Wireless Personal Area Networks (6LowPAN), Zigbee, Z-Wave, Bluetooth Low Energy (BLE), and/or any cellular network or system.

Thus, although terminology from 5G/NR and LTE may be used in this disclosure to exemplify embodiments herein, this should not be seen as limiting the scope of the embodiments herein to only the aforementioned systems.

The wireless communications network 100 may comprise a plurality of nodes, such as, for example, network nodes, wherein one or more network nodes comprising a first node 110 are depicted in the non-limiting example of FIG. 2, as well as a second node 102. The one or more first nodes are network nodes, and are therefore referred to herein as one or more first network nodes 110 comprising the first node, which is a first network node 111. The wireless communications network 100 includes one or more wireless devices represented by 130, 131. One or more first network nodes 110 may be a radio network node, such as a radio base station, or any other network node with similar features capable of serving a user equipment, such as a wireless device or a machine type communication device, in the wireless communications network 100. Any of the one or more first network nodes 110 may be capable of respectively serving a user equipment, such as a wireless device or a machine type communication device, with beamforming beams 121, 122, 123, wherein each of the one or more first network nodes 110 may respectively transmit a respective subset of beamforming beams 121, 122, 123, as depicted in FIG. 2.

Particularly, the first network node 111, can serve a user equipment, such as a wireless device or a machine type communication device with one or more beamforming beams 121. The one or more beamforming beams 121 may be transmitted from an antenna array 124 controlled by the first network node 111. The same may apply to the other first network nodes of the one or more first network nodes 110, as schematically depicted in FIG. 2.

In some embodiments, the first network node 111 may be a first gNB. The first network node 111 could be part of a macro base station (BS), a home BS or a pico BS. The first network node 111 may be directly connected to one or more core networks, which are not depicted in FIG. 2 to simplify the figure. In some examples, any of the first network node 111, may be co-localized, or be part of the same network node. In some examples, at least one of the first network node 111 or second network node 112, may be a distributed node, such as a virtual node in the cloud 125, and it may perform its functions entirely on the cloud 125, or partially, in collaboration with a radio network node. In some examples such as the particular non-limiting example depicted in FIG. 2, there could be the second network node 112 (or 102) as a core network node in the cloud 125 and the first network node 111 may be a gNB.

The wireless communications network 100 covers a geographical area which may be divided into cell areas, wherein each cell area may be served by a network node, although, one network node may serve one or several cells. In the non-limiting example of FIG. 2, the wireless communications network 100 comprises a first cell 126, a second cell 127 and so on. In FIG. 2, the first network node 111 serves the first cell 126. The second cell 127 and the third cell 128 are respectively served by other network nodes of the one or more first network nodes 110.

A plurality of wireless devices may be located in the wireless communication network 100, whereof a wireless device 130, which may also be referred to simply as a device, is depicted in the non-limiting example of FIG. 2. The wireless device 130, e.g., a 5G UE, may be a wireless communication device which may also be known as e.g., a User Equipment (UE), a mobile terminal, wireless terminal and/or mobile station, a mobile telephone, cellular telephone, IoT device, or laptop with wireless capability etc. The wireless device 130 may be, for example, portable, pocket-storable, hand-held, computer-comprised, or a vehicle-mounted mobile device, enabled to communicate voice and/or data, via the RAN, with another entity, such as a server, a laptop, a Personal Digital Assistant (PDA), or a tablet, Machine-to-Machine (M2M) device, device equipped with a wireless interface, such as a printer or a file storage device, modem, or any other radio network unit capable of communicating over a radio link in a communications system. In some embodiments herein, the wireless device 130 may be an Unmanned Aerial Vehicle (UAV) 131, commonly known as a drone and can communicate over wireless radio link 143. A particular non-limiting example of the UAV 131 may be the DJI Mavic Air battery, other battery and/or energy storage technology, which has a maximum charging power of 60 W, a maximum charging voltage of 13.2V, a capacity of 2375 mAh, an energy of 27.43 Wh, a flying voltage of 11.55V, and a fly time duration of 20 min.

The wireless device 130 comprised in the wireless communications network 100 is enabled to communicate wirelessly in the wireless communications network 100. The communication may be performed e.g., via a RAN, and possibly the one or more core networks, which may be comprised within the wireless communications network 100.

The first network node 111 may be configured to communicate in the wireless communications network 100 with a second node 102 over a first link 141, e.g., a radio link or a wired link, although communication over more links may be possible. The second node 102 may be configured to communicate in the wireless communications network 100 with the wireless device 130 over a second link 142, e.g., a radio link, or, if the second node 102 is co-located or comprised in the wireless device 130, a wired link. The first network node 111 may be configured to communicate in the wireless communications network 100 with the wireless device 130 over any of the one or more beamforming beams 121. Any of the other first network nodes of the one or more first network nodes 110 may be configured to respectively communicate in the wireless communications network 100 with the wireless device 130 over the respective subset of beamforming beams 122, 123.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments.

Figure 3A:
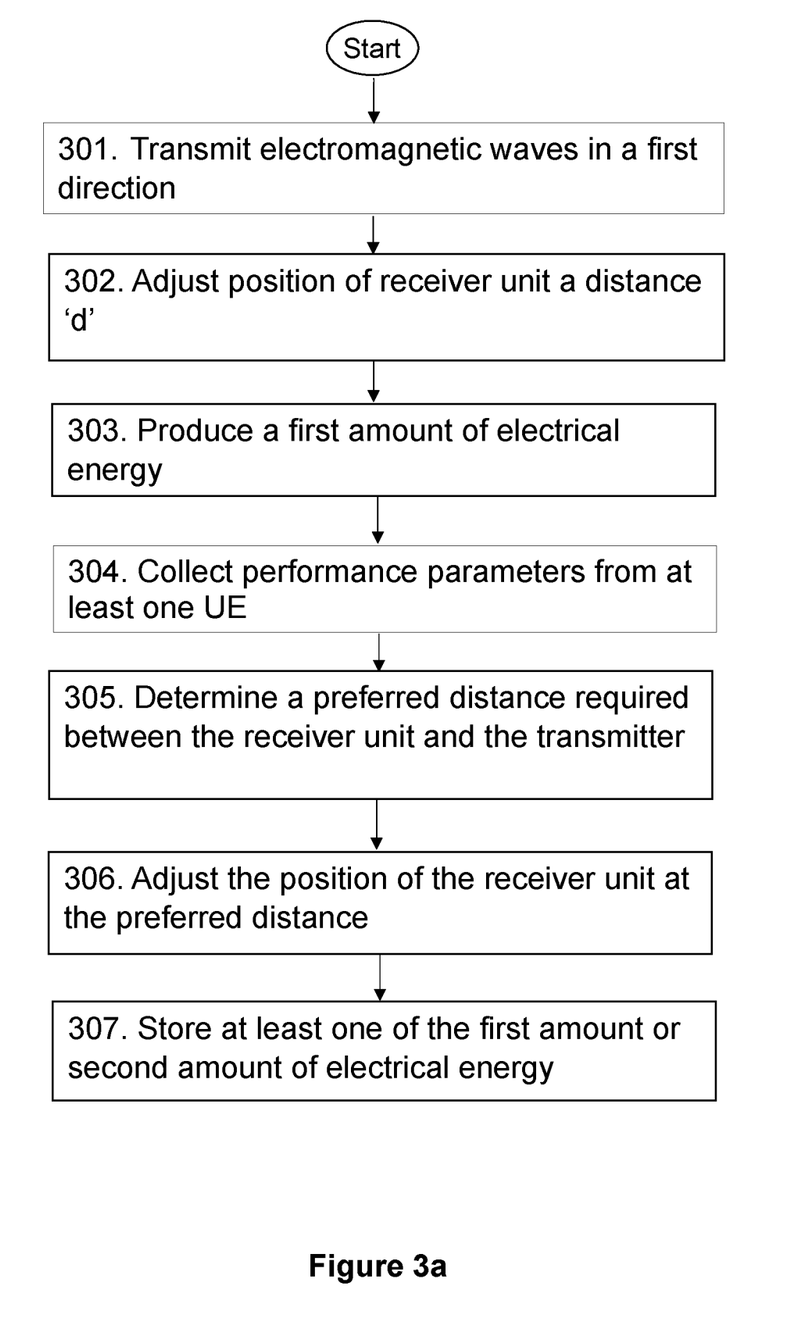
FIG. 3a, 3b, 3c, 3d are flowcharts depicting a method in a network node, according to embodiments herein.

Embodiments of method, performed by the network node 110, will now be described with reference to the flowchart depicted in FIGS. 3a and 3b. The method may be understood to be for improved energy harvesting using the network node 110. The network node 110 and the wireless device 130 operate in the wireless communications network 100.

The method may comprise the actions described below. In some embodiments some of the actions may be performed. In some embodiments all the actions may be performed. In FIG. 3, optional actions are indicated with a dashed box. One or more embodiments may be combined, where applicable. Though the actions are listed in a sequence, other sequence of actions are possible. All possible combinations are not described to simplify the description. It should be noted that the examples herein are not mutually exclusive. Components from one example may be tacitly assumed to be present in another example and it will be obvious to a person skilled in the art how those components may be used in the other examples.

According to embodiments of the present disclosure, the transmitter 402 may be an antenna used for communication in the wireless network. The antenna for efficient energy harvesting may have characteristics that are different from those of a communications antenna. The antenna types and forms covered in this disclosure include:

1. A classical antenna in the sense of communications to be used as a transmitting or receiving antenna such as a directional, monopole, a dipole, bow-tie or loop antenna;
2. An antenna array wherein each antenna in the array is substantially the same from antenna to antenna.
3. An antenna array wherein each antenna in that array is tuned to a particular frequency or range of frequencies in the RF spectrum.

Action 301

In this Action 301, the network node 110 utilises the transmitter 402 to transmit electromagnetic waves (in form of beamforming beams) in a first direction. The first action indicates the start of an energy harvesting session. This Action 301 may typically take place whenever the wireless device 130 initiates a request for a charging session. The action 310 may also take place when low traffic load within the communications. For example, the low traffic load may occur at night, afternoon and the like. In action 301, transmission may be implemented by a directional antenna, e.g., via the one or more beamforming beams 121, 122, 123.

The energy harvesting session may be implemented, for example, by creating a new reference signal, that may be sent from wireless device 130 to activate the energy charging need, or by creating a power indication of the wireless device 130 or UAV 131, to inform the first network node about the battery status thereof.

Action 302

In this Action 302, the network node 110 positions a receiver unit 406 at a distance 'd' from the transmitter 402. In an example, the receiver unit 406 could include an inductor. In another example, the receiver unit 406 comprises a receiver, charging coil, a rectifier. The distance 'd' of the receiver unit 406 from the transmitter 402 may be adjusted by using an actuator. In an example, the actuator is a robotic arm. The position of the receiver unit 406 is adjusted such that the receiver unit 406 does not cause interference during data transmission to the wireless devices.

Action 303

In this action, the network node 110 produces a first amount of electrical energy (or a first batch of electrical energy) in the receiver unit 406 in response to the electromagnetic waves transmitted. In an embodiment, the inductor or charging coil present in the receiver unit 406 produces the first amount of electrical energy through an arrangement depicted in FIG. 1.

Action 304

In this action, the network node 110 collects performance parameters from at least one wireless device, for example, a user equipment. Thereafter, the performance parameters are received by a control unit present in the network node 110. The performance parameters include quality of experience parameters associated with the wireless device including but not limited to radio quality metrics, network transmission metrics, streaming quality metrics, and user activity details. Some of the examples of radio quality metrics include RSSI, RSRQ, signal to noise (SNR), reference signal received power (RSRP), CQI. Examples of network transmission metrics include packet loss, jitter at the layer, packet delay, radio block utilization(congestion), Receiver throughput, transmission throughput. Examples of streaming quality metrics include Stalling events in a video streaming, frame rate, video playout bitrate, web page loading time. The performance parameters may also include 'PM' counters that determines the duration of low activity for a particular cell.

Action 305

In this action, the control unit determines the preferred distance required between the receiver unit 406 and the transmitter 402. The preferred distance is a distance at which a higher amount of electrical energy maybe produced without compromising the performance parameters. The step of determining the preferred distance comprises executing a machine learning process by the control unit with at least one of performance parameters and the first amount of electrical energy as inputs. In an example, the machine learning process is at least one of reinforcement learning, and supervised learning. With the collected performance parameters, the control unit determines whether the quality of service to wireless device's is being affected by the energy harvesting session (in action 301). Further, the control unit also identifies the low-activity duration of the cell from the performance parameters and determines the preferred distance. In aforementioned scenario, the preferred distance of the could be closer to the transmitter 402. In another example, the control unit identifies that the performance parameters have weakened with the initiation of energy harvesting session. Herein, the preferred distance of the receiver unit 406 could be further away from the transmitter. Additionally, the control unit executes a machine learning process using the first amount of electrical energy harvested as an additional input to further determine adjustments that can be made to the preferred distance of the receiver unit 406 in order to maximise the electrical energy harvested. In another embodiment, the control unit while determining preferred distance identifies that the performance parameters are weakened with existing distance 'd', and thus the preferred distance could be 'null', where the receiver unit 406 has to completely be removed from the direction of the transmitter 402.

Action 306

In this action, the network node 110 adjusts the position of the receiver unit 406 to the preferred distance (identified in action 305). The control unit present in the network node 110 adjusts the position of the receiver unit 406 at the preferred distance from the transmitter 402. In an embodiment herein, the control unit transmits the value of the preferred distance to an actuator mechanism. The actuator mechanism provides a linear movement to the receiver unit 406 based on the value of the preferred distance. The actuator mechanism may include robotic arms.

Action 307

In this action, network node 110 stores at least one of the first amount or second amount of electrical energy in a power distribution unit 408. The power distribution unit 408 is electrically coupled to the receiver unit 406 and configured to receive energy generated therefrom. When the transmitter 402 transmits electromagnetic waves in the form of beams, the receiver unit 406 produces a direct current, which is further transmitted to the power distribution unit. In an example, the power distribution unit may include at least one of a battery, a capacitor, or an electric double layer capacitor (EDLC). The power distribution unit may store the harvested electrical energy in the battery or capacitor for future usage by the network node 110. The stored electrical energy may be used by the network node for devices therein. The power distribution unit 408 may be part of the base station.

Figure 3B:
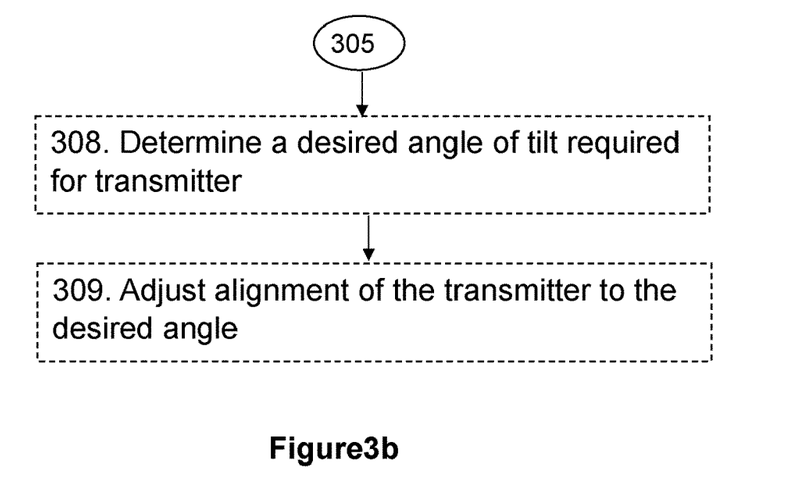
Figure 3C:
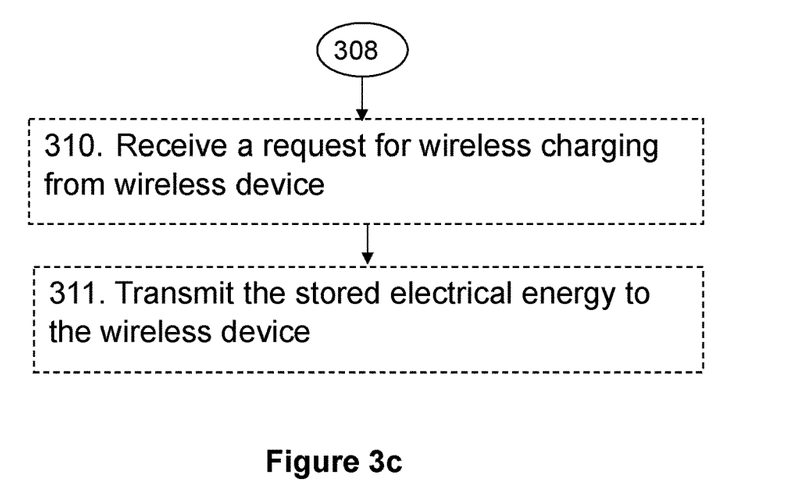
Figure 3D:
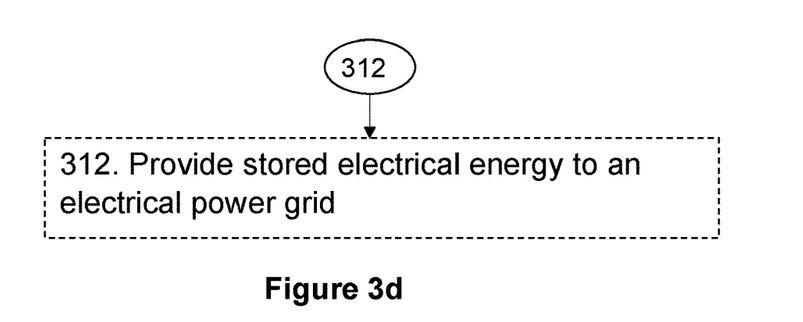

Some of the additional embodiments involved in energy harvesting using the network node 110 are depicted in FIG. 3b to 3d.

Action 308

This action may be followed by action 305. In this action, the network node 110 determines a desired angle of tilt required for the transmitter 402 in response to the performance parameters (received in action 304). The desired angle of tilt is an angle of the transmitter 402 at which comparatively higher amount of electrical energy may be produced. The step of determining the desired angle of tilt comprises executing a machine learning process by the control unit with at least one of performance parameters, the first amount of electrical energy, and current tilt as inputs. In an example, the machine learning process executed by the control unit uses a learning agent to analyse the inputs and provide an output, herein the desired angle of tilt as a reward. The desired angle of tilt may be also determined for a second amount of electrical energy as input to further calculate a third amount of electrical energy that may be generated.

Action 309

In this action the network node 110 adjusts an alignment of the transmitter 402 to the desired angle determined in action 308. The adjustment of the alignment of the transmitter 402 is performed by varying the angle of tilt thereof. The adjustment is performed by the actuator mechanism that is configured to position the transmitter 402 to achieve the desired angle of tilt. As a result of action 309, the amount of energy harvested may be improved and any interference caused to wireless devices in the coverage area may be reduced.

Action 310

This action may follow action 308. In this action, the network node 110 receives a request for wireless charging from a wireless device 130 or UAV 131. The network node 110 may operate in a charging mode and a non-charging mode. The network node 110 may choose to accept or reject the request for wireless charging. In an example, the network node 110 may reject the request for wireless charging when the transmitter 402 is positioned in a cell with a high traffic load.

Action 311

In this action, the network node 110 transmits the stored electrical energy from the power distribution unit 408 to the wireless device 414 in response to acceptance of the request for wireless charging. The electrical energy is transmitted through existing wireless power transfer methods. The network node 110 may also initiate action 301 in response to the request to allocate one or more beamforming beams 121, 122, 123 to charge the wireless device 130.

Action 312

This action may follow action 308. In this action, the network node 110 transmits the stored electrical energy to an electrical power grid. The electrical power may be transmitted from the power distribution unit 408 present in the network to the electrical grid through High-voltage direct-current (HVDC) technology. The electrical power may be transmitted through overhead power lines coupled to the power distribution unit.

The embodiments herein where the methods performed by the network node 110 and the control unit 404 may be implemented through one or more processors, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the control unit 404. One such carrier may be in the form of a CD ROM disc. It is however feasible with other data carriers such as a memory stick. The computer program code may furthermore be provided as pure program code on a server and downloaded to the control unit 404.

Figure 4A:
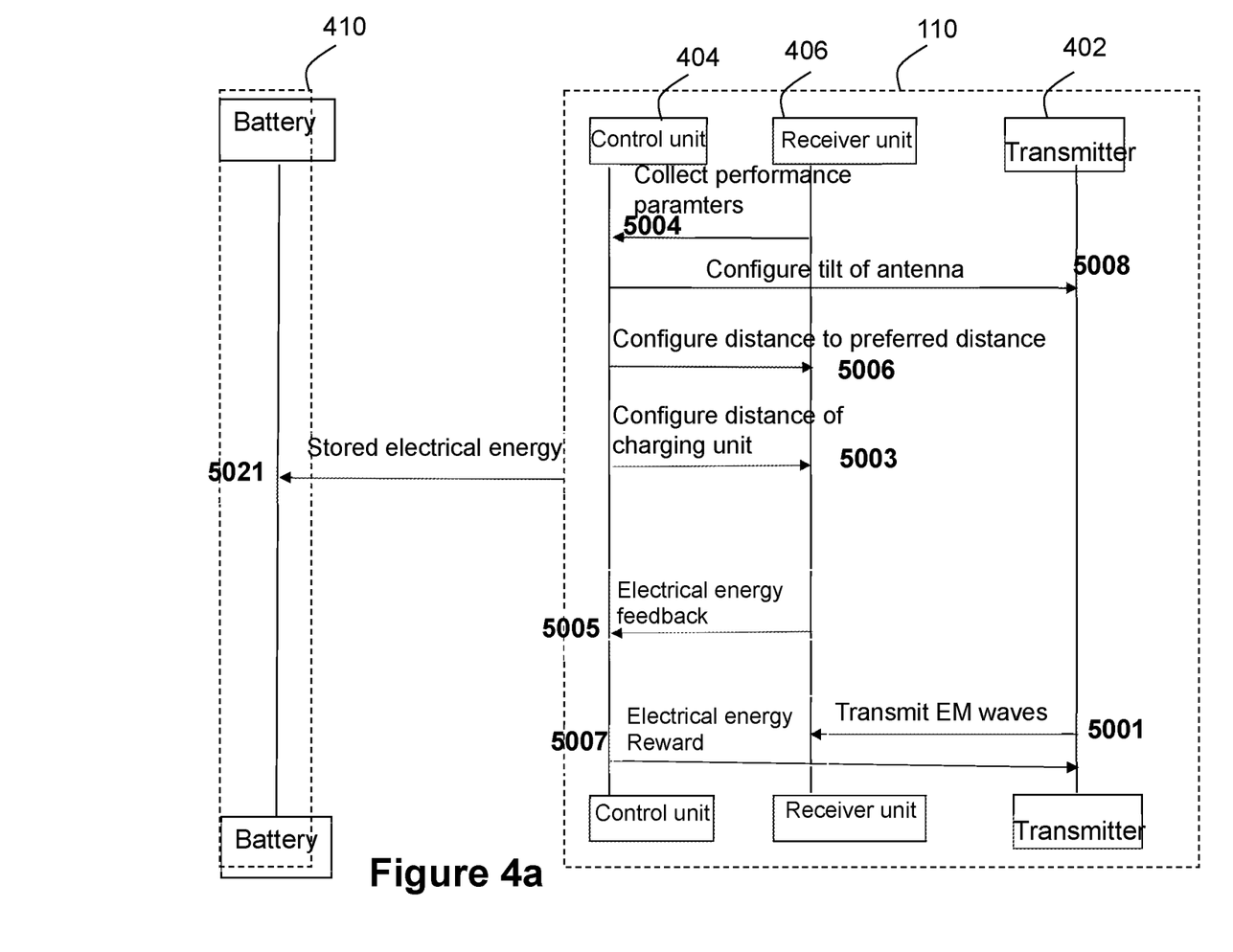
FIGS. 4a and 4b are schematic diagrams illustrating sequence of communication between components in a communication network.
Figure 4B:
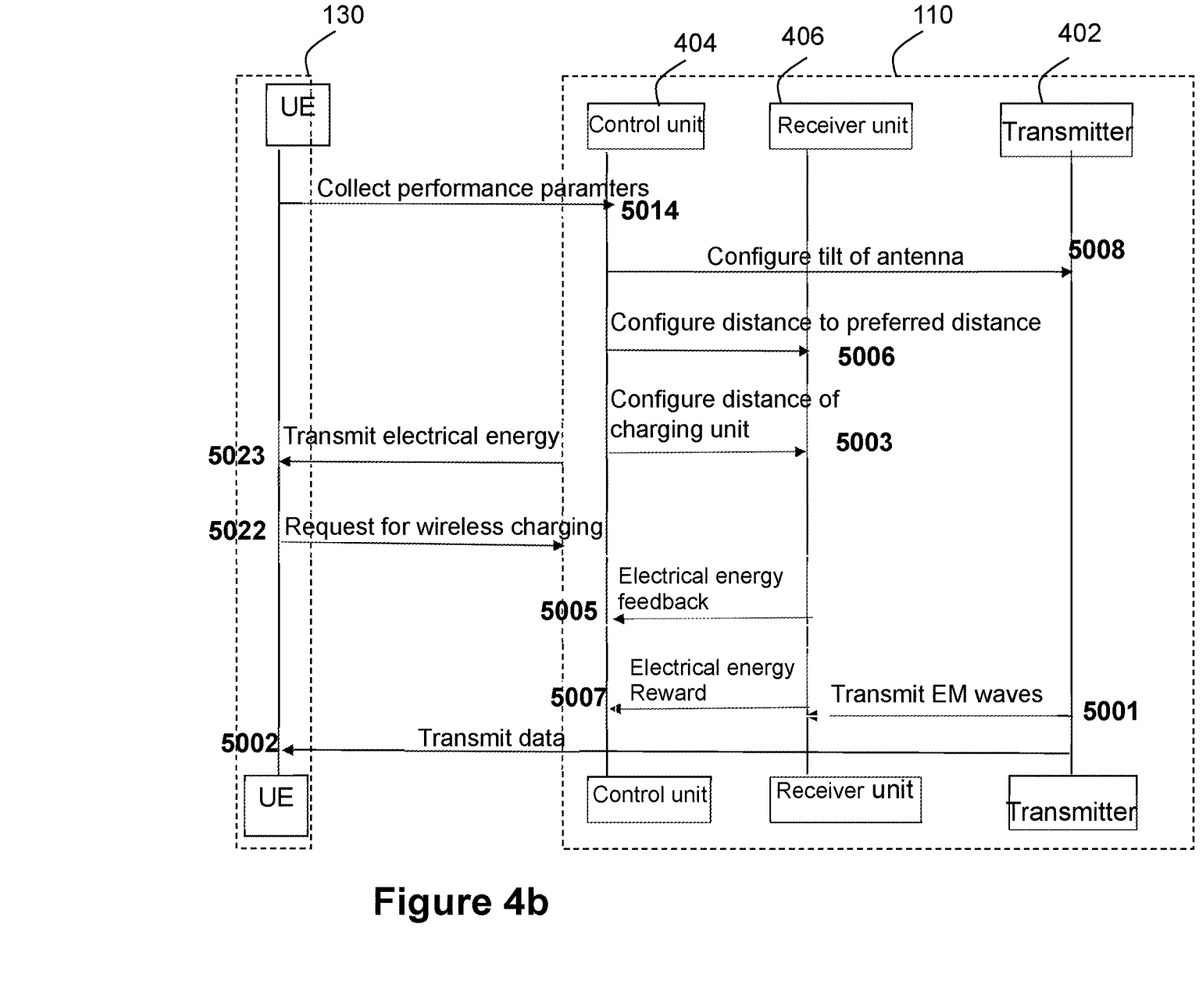

FIGS. 4a and 4b are schematic representations of the actions that the network node 110, and the control unit 404 may perform, according to a non-limiting example of embodiments herein. In this non-limiting example, the control unit 404, the receiver unit 406 and the transmitter 402 are co-localised in the network node 110.

In action, 5001, the transmitter 402 transmits EM waves to the receiver unit 406. The transmitter 402 may choose to transmit EM waves when data is not being transmitted to the wireless device 130. In action 5003, the control unit 404 provides instructions to the receiver unit 406 to configure distance of the receiver unit 406. Initially, the distance of the receiver unit 406 is positioned at a distance 'd'. In response to action 5003, the receiver unit 406 produces a first amount (or first batch) of electrical energy from the EM waves received from transmitter 402. In action 5004, the control unit 404 receives performance parameters from the receiver unit 406. The control unit 404 uses the performance parameters and the value of the first amount of electrical energy feedback (action 5005) to determine a preferred distance. In action 5006, the control unit 404 communicates the preferred distance with the receiver unit 406. The receiver unit 406 is further configured at the preferred distance with respect to the transmitter 402. A second amount of electrical energy is generated by the receiver unit 406 after configuration at the preferred distance. In action 5007, the control unit further analyses a reward electrical energy which is the second amount of electrical energy generated. The control unit 404 further determines a desired angle of tilt required for the transmitter 402. In action 5008, the control unit communicates the desired angle of tilt determined with the transmitter 402. The transmitter 402 is further configured to attain the desired angle of tilt, that enables comparatively improved electrical energy generation.

The step of generation of electrical energy including the first amount of electrical energy (in action 5003) or the second amount of electrical energy (in action 5007), may be followed by storage of the electrical energy. In action 5021, the first amount of electrical energy or the second amount of electrical energy is stored in a battery 410. The battery 410 may be a component of the network node or the power distribution unit (408). The electrical energy stored in the battery 410 maybe used by other components such as sensors present in the network node.

Another embodiment of the present disclosure is illustrated in FIG. 4b, where the network node communicates with the wireless device (shown as UE in FIG. 4b). The wireless device 130 in this example is a user equipment which is positioned in the service coverage area of the network node 110.

In action, 5001, the transmitter 402 transmits EM waves to the receiver unit 406. The transmitter 402 may also transmit data to the wireless device 130 (action 5002). The transmitter 402 may also initiate transmission of EM waves in response to a wireless charging request (5022) received from the wireless device 130. In action 5003, the control unit 404 provides instructions to the receiver unit 406 to configure distance of the receiver unit 406. Initially, the distance of the receiver unit 406 is positioned at a distance d. In response to action 5003, the receiver unit 404 produces a first amount (or first batch) of electrical energy from the EM waves received from transmitter 402. In action 5014, the control unit 404 receives performance parameters from the wireless device 130. The control unit 404 uses the performance parameters and the value of the first amount of electrical energy feedback (action 5005) to determine a preferred distance. In action 5006, the control unit 404 communicates the preferred distance with the receiver unit 406. The receiver unit 406 is further configured at the preferred distance with respect to the transmitter 402. A second amount of electrical energy is generated by the receiver unit 406 after configuration at the preferred distance. In action 5007, the control unit further analyses a reward electrical energy which is the second amount of electrical energy generated. The control unit 404 further determines a desired angle of tilt required for the transmitter 402. In action 5008, the control unit communicates the desired angle of tilt determined with the transmitter 402. The transmitter 402 is further configured to attain the desired angle of tilt that may improve performance parameters while harvesting energy.

In the action 5022, the wireless device 130 transmits a request for wireless charging to the network node. In an embodiment, the actions 5001 to 5008 may occur post the completion of action 5020. In action 5023, the control unit transmits the electrical energy, which may be a stored electrical energy (from action 5021 in FIG. 4a) or the first/second amount of electrical energy. The electrical energy is transmitted to the wireless device 130 wirelessly.

Figure 5:
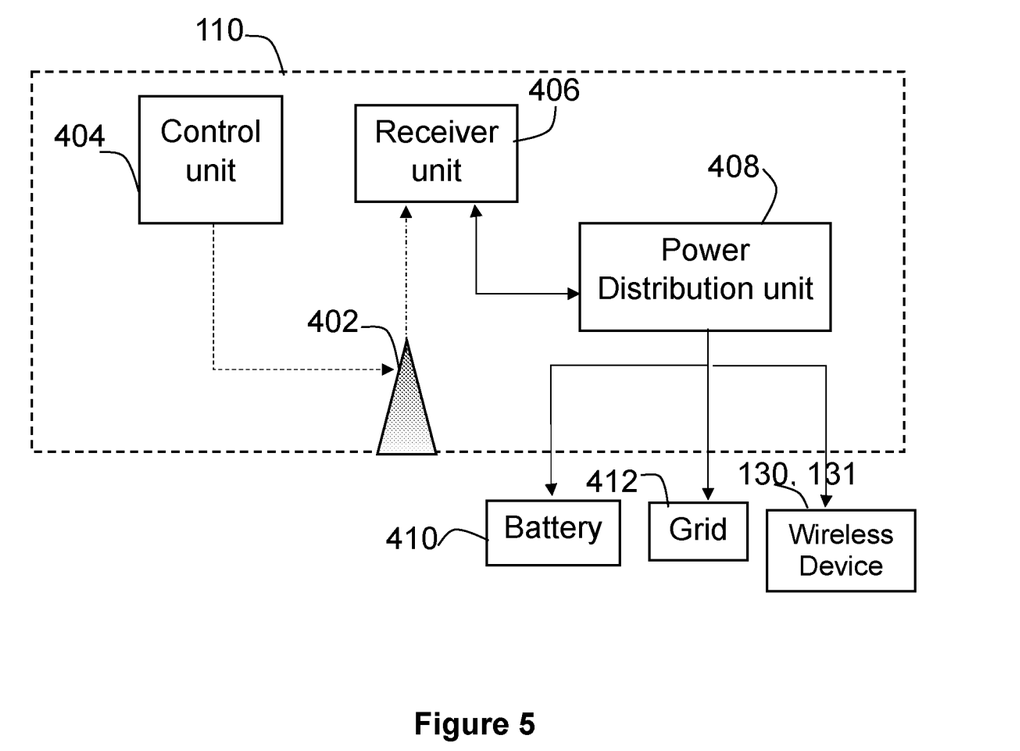
FIG. 5 is a schematic block diagram illustrating non-limiting examples, of a network node, according to embodiments herein.
Figure 6:
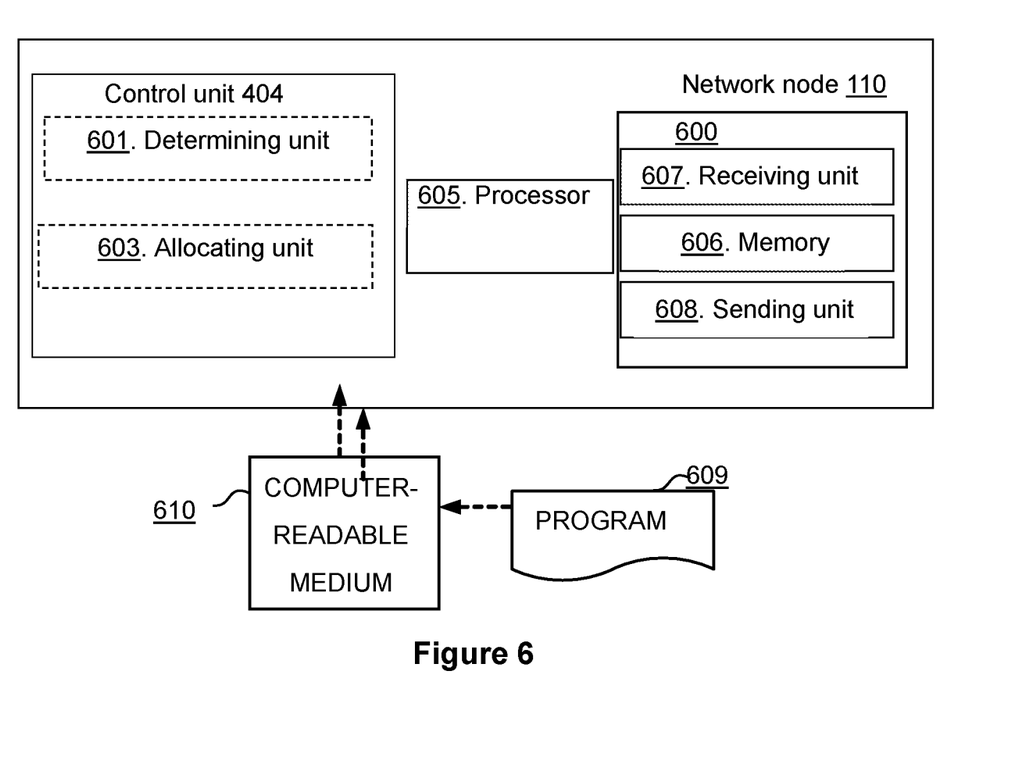
FIG. 6 is a schematic block diagram illustrating a non-limiting example arrangement of the network node.

To perform the method actions mentioned above in FIGS. 4a and 4b for energy harvesting and wireless charging, the network node 110, may comprise an arrangement as depicted in FIG. 5 and FIG. 6.

FIG. 5 is a schematic block diagram illustrating a non-limiting example of a network node, according to an embodiment herein. The network node 110 comprises a transmitter 402, a control unit 404, a receiver unit 406, and a power distribution unit 408.

The transmitter 402 is a directional antenna directed in a first direction and configured to transmit electromagnetic waves according to action 301. The receiver unit 406 is positioned at a distance 'd' from the transmitter 402 according to action 302. The receiver unit 406 is configured to generate a first electrical energy from the electromagnetic waves according to action 303. The receiver unit 406 may be an inductor circuit with a rectifier for generation of a direct current. The receiver unit 406 is electrically coupled to the control unit 404. The control unit 404 is configured to perform actions 304, 305, 306, 308 and 309. The control unit 404 may comprise a processor and a memory and is configured to execute a machine learning process to perform actions 304, 305, 306, 308 and 309. The control unit 404 receives performance parameters from wireless devices, and further analyse the performance parameters to determine a preferred distance of the receiver unit 406. The control unit 404 provides instructions to adjust the position of the receiver unit 406 to the preferred distance with respect to the transmitter 402 such that the energy harvested by the receiver unit 406 may be increased (to a second electrical energy greater than the first electrical energy) as mentioned in action 306. The control unit 404 may give instructions to adjust the distance of the receiver unit 406 to the predetermined distance and also adjust the tilt to the desired angle of tilt as mentioned in actions 306 and 309. Further, the energy harvested (a first or second amount of electrical energy) by the receiver unit 406 is transmitted and stored in the power distribution unit 408 as mentioned in action 307. The power distribution unit 408 communicates with the grid 412, battery 410 and wireless devices 130, 131 to perform the actions 310, 311 and 312. The power distribution unit 408 may transmit the harvested energy to a wireless device upon request as mentioned in action 310 and 311. The power distribution unit 408 may store the harvested energy in the grid 412 for a later usage by the network node. The power distribution unit 408 may store the harvested energy in a battery 410 or a capacitor.

In an embodiment herein, the network node 110 may comprise a communication interface 600 as depicted in FIG. 6, configured to communicate with the communications network 100, also referred to as a cloud network. The communication interface 600 may comprise a wireless receiver (not shown) and a wireless transmitter (not shown) and e.g. one or more antennas. The embodiments herein may be implemented through a processor 605 configured to perform the methods herein. The processor 605 could be a formed by one or more processors. Thus, it is herein provided the first network node 11 e.g. comprising processor and memory, said memory comprising instructions executable by said processing circuitry whereby said network node 11 is operative to perform the methods herein.

The network node 110 may comprise a receiving unit 607, e.g. a receiver or a transceiver with one or more antennas. The processor 605, the network node 110 and/or the receiving unit 607 is configured to receive from the wireless device 130, performance parameters and the request for wireless charging.

The network node 110 may comprise a determining unit 601. The determining unit 601 is configured to receive inputs such as performance parameters and amount of electrical energy to determine or compute values of a preferred distance and tilt angles. The processor 605, the network node 110 and/or the determining unit 601 is configured to determine a preferred distance required between the receiver unit 406 and the transmitter 402, responsive to the collected performance parameters. The processor 605, the network node 110 and/or the determining unit 601 is configured to determine a desired angle of tilt required for the transmitter 402 in response to the performance parameters, wherein the desired angle of tilt is an angle at which comparatively a higher amount of electrical energy may be produced. The determining unit 601 is part of the control unit. The processor 605, the network node 110 and/or the determining unit 601 is configured to execute a machine learning process, for example, a reinforcement learning model to compute the preferred distance and the desired angle of tilt.

The network node 110 further comprises a sending unit 608, for example, a receiver or a transceiver with one or more antennas. The sending unit 608 is configured to transmit a value of the preferred distance to the receiver unit 406. Further, the sending unit 608 is configured to transmit a value of the desired angle of tilt to the transmitter 402. The sending unit 608 also transmits instructions to transmitter 402 to initiate a wireless charging session by transmitting EM waves. The sending unit also transmits instructions to the power distribution unit to store and transmit the electrical energy harvested.

It is to be noted in one embodiment, the network node 110 depicted in FIG. 6 could be replaced by a second node 102, which is part of the cloud network 125. The cloud network 125 may communicates with a node 111 in the radio base station to perform energy harvesting. In such scenario, the machine learning process is executed in the cloud network 125 to control operations of energy harvesting and wireless charging in the radio base station.

According to embodiments herein, the network node that can comparatively increase the energy harvested by the transmitter without affecting the performance parameters of the wireless devices in an area serviced by the network node. Another advantage of the present invention is that the network node may provide electrical energy to wireless devices or store the electrical energy within the network node for later usage. Yet another advantage of the present invention is that the network node provides a receiver unit for energy harvesting with a control functionality, so that the distance of the receiver unit may be increased or decreased with the proviso of interference.

When using the word "comprise" or "comprising", it shall be interpreted as non-limiting, i.e. meaning "consist at least of". The embodiments herein are not limited to the above described preferred embodiments. Various alternatives, modifications and equivalents may be used. Therefore, the above embodiments should not be taken as limiting the scope of the invention.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

Any of the terms processor and circuitry may be understood herein as a hardware component.

As used herein, the expression "in some embodiments" has been used to indicate that the features of the embodiment described may be combined with any other embodiment or example disclosed herein.

As used herein, the expression "in some examples" has been used to indicate that the features of the example described may be combined with any other embodiment or example disclosed herein.

The invention claimed is:

1. A method for energy harvesting in a wireless communication network, the method being performed by a network node, the method comprising:
transmitting, by a transmitter of the network node, electromagnetic waves in a first direction;
positioning a receiver of the transmitter at a distance 'd' from the transmitter;
producing a first amount of electrical energy in the receiver in response to the electromagnetic waves;
collecting, by the network node, performance parameters from at least one wireless device during the production of the first amount of electrical energy;
determining, by the network node, a preferred distance required between the receiver and the transmitter, responsive to the collected performance parameters, wherein the preferred distance is a distance at which a greater amount of electrical energy is produced than the first amount of electrical energy;
adjusting, by the network node, a position of the receiver at the preferred distance to the transmitter to harvest a second amount of electrical energy, where second amount is greater than the first amount;
storing, at the network node, at least one of the first amount or second amount of electrical energy harvested by the receiver.

2. The method as claimed in claim 1, further comprising:
determining, by the network node, a desired angle of tilt required for the transmitter in response to the performance parameters, wherein the desired angle of tilt is an angle at which comparatively higher amount of electrical energy is produced than the first amount of electrical energy; and
adjusting, by the network node, an alignment of the transmitter to achieve the desired angle of tilt.

3. The method as claimed in claim 1, further comprising:
receiving, by the network node, a request for wireless charging from a wireless device; and
transmitting, the stored electrical energy from the network node to the wireless device in response to the request.

4. The method as claimed in claim 1, further comprising providing the stored electrical energy from the network node to an electrical power grid.

5. The method as claimed in claim 1, wherein adjusting the position of the receiver is performed by an actuator mechanism that is coupled thereto.

6. The method as claimed in claim 1, wherein adjusting the position of the receiver comprises:
transmitting a value of the preferred distance to the actuator mechanism; and
providing a linear movement using the actuator mechanism to adjust the position of the receiver to the preferred distance.

7. The method as claimed in claim 1, wherein determining the preferred distance and/or the desired angle of tilt comprises executing a machine learning process by the network node with at least one of the performance parameters and the first level of electrical energy as inputs.

8. The method as claimed in claim 7, wherein the machine learning process comprises inputting the performance parameters and the first level of electrical energy to a machine learning model to train a reinforcement learning agent.

9. The method of claim 1, wherein the performance parameters received from the wireless device comprises quality of experience parameters.

10. The method as claimed in claim 9, wherein the quality of experience parameters comprises radio quality metrics, network transmission metrics, streaming quality metrics, and user activity details.

11. A network node for providing wireless charging, the network node comprising:
a transmitter directed in a first direction and configured to transmit electromagnetic waves in the first direction;

a receiver positioned at a distance 'd' from the transmitter and configured to produce a first amount electrical energy in response to the electromagnetic waves;

processing circuitry; and memory, said memory comprising instructions executable by said processing circuitry whereby said network node is configured to:

collect performance parameters from at least one wireless device;

determine a preferred distance required between the receiver and the transmitter, responsive to the collected performance parameters;

adjust a position of the receiver at the preferred distance to the transmitter to harvest a second amount of electrical energy, where second amount is greater than the first amount; and     store, at the network node, at least one of the first amount or second amount of electrical energy harvested by the receiver.

12. The network node as claimed in claim 11, further comprising an actuator mechanism electrically coupled to the receiver and configured to adjust a position of the receiver to the distance 'd' or the preferred distance.

13. The network node as claimed in claim 11, wherein said memory comprises instructions executable by said processing circuitry whereby said network node is configured to:

receive a request for wireless charging from the wireless device; and     transmit the stored electrical energy to the wireless device in response to the request.

14. The network node as claimed in claim 11, wherein said memory comprises instructions executable by said processing circuitry whereby said network node is configured to provide the stored electrical energy to an electrical power grid.

15. The network node as claimed in claim 11, wherein said memory comprises instructions executable by said processing circuitry whereby said network node is configured to:

determine a desired angle of tilt required for the transmitter in response to the performance parameters, wherein the desired angle of tilt is an angle at which a comparatively higher amount of electrical energy may be produced than the first amount; and     adjust an alignment of the transmitter to the desired angle of tilt.

16. The network node as claimed in claim 11, wherein said memory comprises instructions executable by said processing circuitry whereby said network node is configured to execute a machine learning process with at least one of the performance parameters and the first level of electrical energy as inputs to obtain the preferred distance and the desired angle of tilt as outputs.

17. The network node as claimed in claim 16, wherein the machine learning process comprises inputting the performance parameters and the first level of electrical energy to a machine learning model to train a reinforcement learning agent.

18. The network node as claimed in claim 11, wherein said memory comprises instructions executable by said processing circuitry whereby said network node is configured to provide the stored electrical energy to an electrical power grid.

19. The network node as claimed in claim 11, further comprising a power distribution unit configured to store, in a battery or a capacitor, the at least one of the first amount or second amount of electrical energy harvested by the receiver.

20. The network node as claimed in claim 11, wherein the receiver is an inductor circuit with a rectifier for generation of a direct current.

* * * * *